(12) United States Patent
Nguyen et al.

(10) Patent No.: US 6,829,342 B2
(45) Date of Patent: Dec. 7, 2004

(54) SYSTEM AND METHOD FOR HANDLING VOICE CALLS AND DATA CALLS

(75) Inventors: Hong Thi Nguyen, Atlanta, GA (US); Linda Ann Roberts, Decatur, GA (US); Edward Michael Silver, Atlanta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 423 days.

(21) Appl. No.: 10/135,667

(22) Filed: Apr. 30, 2002

(65) Prior Publication Data
US 2003/0202646 A1 Oct. 30, 2003

(51) Int. Cl.[7] .............................................. H04M 3/42
(52) U.S. Cl. ............................ 379/212.01; 379/221.08; 379/221.11
(58) Field of Search .................... 379/207.02, 211.02, 379/212.01, 221.08, 221.09, 221.11, 221.12, 230

(56) References Cited

U.S. PATENT DOCUMENTS

| | | | | | |
|---|---|---|---|---|---|
| 5,615,253 | A | * | 3/1997 | Kocan et al. | 379/196 |
| 5,684,825 | A | * | 11/1997 | Ko | 375/222 |
| 6,108,405 | A | * | 8/2000 | Luong | 379/93.11 |
| 6,134,311 | A | * | 10/2000 | Ekstrom | 379/201.01 |
| 6,226,372 | B1 | * | 5/2001 | Beebe et al. | 379/189 |
| 6,311,231 | B1 | * | 10/2001 | Bateman et al. | 379/265.09 |
| 6,332,021 | B2 | | 12/2001 | Latter et al. | |
| 6,359,977 | B1 | * | 3/2002 | Rudd et al. | 379/184 |

* cited by examiner

Primary Examiner—Bing Q. Bui
(74) Attorney, Agent, or Firm—Jones Day

(57) ABSTRACT

A telephone network includes a service switching point, a service control point, and a service node. The service node determines whether a call to a telephone line is a voice call or a data call. Based on this determination, the telephone network may connect the call to the telephone line, redirect the call to a service line, or terminate the call.

39 Claims, 5 Drawing Sheets

SYSTEM AND METHOD FOR HANDLING VOICE CALLS AND DATA CALLS

BACKGROUND

1. Field of the Invention

The invention relates to the field of switched telephony, and more particularly to a system and method for conditionally connecting voice calls and data calls.

2. Description of the Related Art

In a telephone network, a data path known as a voice channel is used for both a voice call and a data call. A voice call is a telephone call transmitting voice communication data generated by two or more people conversing over the telephone network. A data call is a telephone call transmitting electronic communication device data generated by electronic communication devices such as facsimile machines, fax modems, and the like. When a person answers a telephone call, the telephone receives the communication data transmitted over the voice channel and a transducer in the telephone generates an audible signal from the communication data. If the call received at the telephone is a voice call, the audible signal generated by the transducer is a reconstruction of the caller's voice. However, if the call received at the telephone is a data call, the audible signal generated by the transducer is usually a loud, high-pitched electronic tone.

When a person answers a telephone call that has electronic communication device data on the voice channel, the unexpected, high-pitched electronic tone is very annoying. Similarly, when a person places a call, and inadvertently dials a number that is associated with an electronic communication device, the unexpected, high-pitched electronic tone the person hears when the call is connected is equally annoying.

SUMMARY

Provided is a system and method for terminating, redirecting, or connecting a call to a called telephone line in a telephone network based on whether the call is a voice call or a data call.

A system according to the invention includes a service switching point, a service control point, and a service node. The service switching point serves a telephone line and is operable to receive a call to the telephone line and issue a query in response to receiving the call.

The service control point is in communication with the service switching point over a first communication path, and is operable to provide instructions to the service switching point to connect the call to the telephone line or transfer the call.

The service node is in communication with the service switching point over a second communication path, and is operable to receive a transferred call from the service switching point. The service node is also operable to determine whether the transferred call is a voice call or a data call, and transfer the transferred call to the service switching point if the transferred call is not a data call.

Upon receiving the call to the telephone line, the service switching point issues a first query to the service control point, and the service control point instructs the service switching point to transfer the call to the service node. The service switching point transfers the call to the service node, and the service node receives the call and determines whether the call is a voice call or a data call. If the call is not a data call, the service node transfers the call back to the service switching point.

Also according to the invention, a method of processing a call to a telephone line in a telephone network is provided. The telephone network includes a service switching point, a service control point, and a service node. The service switching point serves the telephone line, and the service control point and the service node are in communication with the service switching point over first and second communication paths, respectively.

The method includes the steps of receiving the call to the telephone line at the service switching point, and issuing a first query from the service switching point to the service control point in response to receiving the call. In response to the first query, the service control point issues instructions to the service switching point to transfer the call to the service node. The service node determines whether the call is a voice call or a data call, and transfers the call back to the service switching point if the call is not a data call.

Another method according to the invention includes the steps of receiving the call to the telephone line at the service switching point and issuing a query from the service switching point to the service control point in response to receiving the call. The service control point issues to the service switching point an instruction to transfer the call to the service node. The service node determines whether the call is a data call, and based on this determination, the service node transfers the call back to the service switching point. The service switching point then connects the call to the telephone line.

Also according to the invention, a telephone network includes a service switching point, a service control point, and a service node. The service switching point is operable to issue a query upon receiving a call to the telephone line. The service control point is in communication with the service switching point, and is operable to receive the query and instruct the service switching point to transfer the call.

The service node is in communication with the service switching point, and is operable to receive the call transferred from the service switching point and monitor voice channel data of the call to determine whether electronic communication device data is present. Based on this determination, the service node transfers the call to the service switching point for connection to the telephone line.

DETAILED DESCRIPTION

Figure 1:
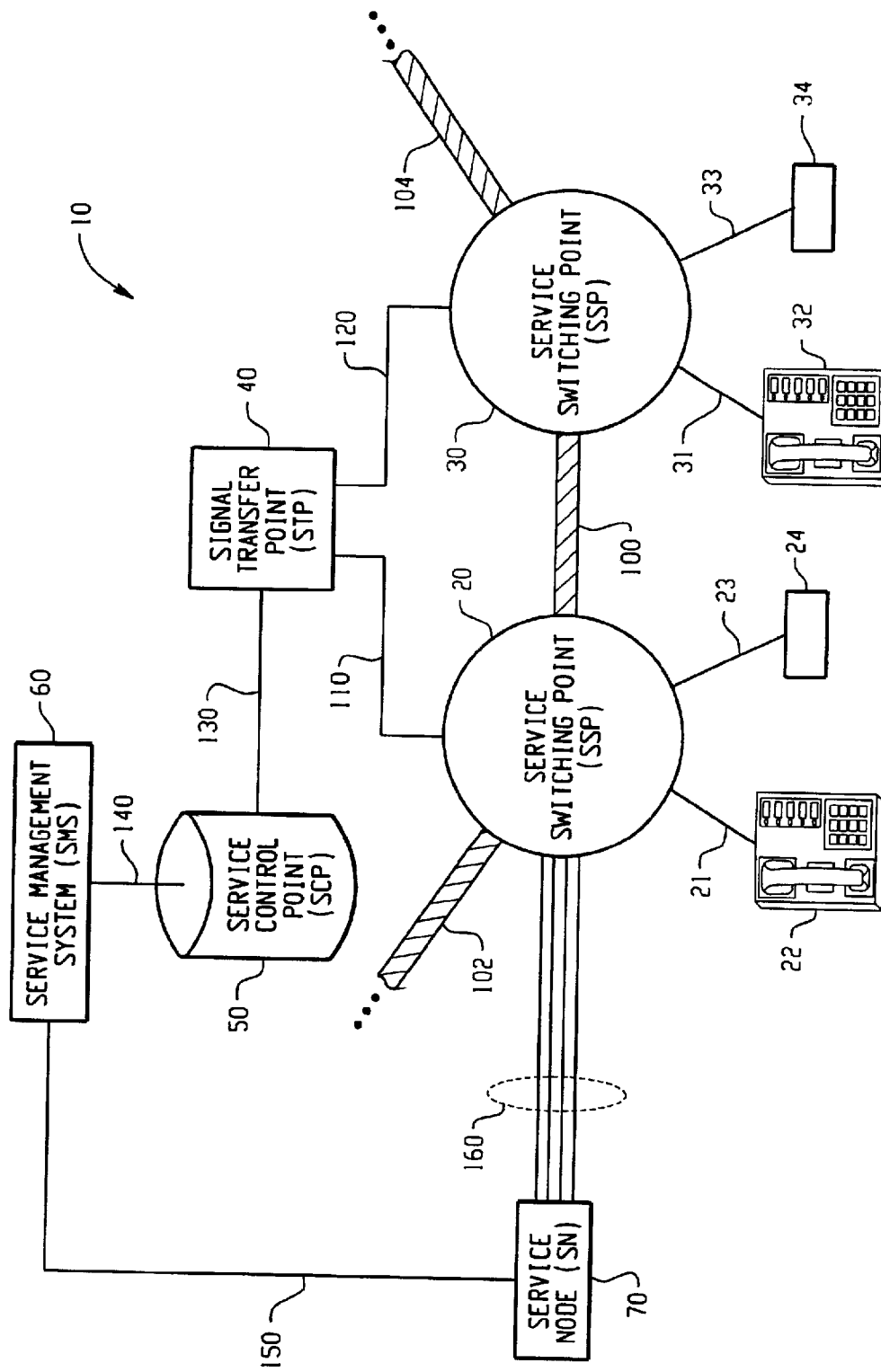
FIG. 1 is a block diagram of a portion of an illustrative Advanced Intelligent Network (AIN) environment.

The system redirects, terminates or connects a call to a telephone line in a telephone network based on whether the call is a voice call or a data call. Referring to FIG. 1, the system 10 is illustratively implemented in Advanced Intelligent Network (AIN) environment. The AIN is a telephone network that provides advanced call-processing capabilities and services to subscribers. The architecture of the AIN is well known to those of ordinary skill in the art, and illustratively includes Service Switch Points (SSP) 20 and 30, a Signal Transfer Point (STP) 40, a Service Control Point (SCP) 50, a Service Management System (SMS) 60, and a Service Node (SN) 70. The SSP 20 and SSP 30 are connected by trunk circuits 100. Additionally, the SSP 20 is connected to another SSP (not shown) by trunk circuits 102, and the SSP 30 is connected to another SSP (not shown) by trunk circuits 104. The SSP 20 is further coupled to the STP 40 by a signaling link 110, and the SSP 30 is further coupled to the STP 40 by a signaling link 120. Similarly, the STP 40 is coupled to the SCP 50 by a signaling link 130; the SCP 50 is connected to the SMS 60 by a signaling link 140; and the SMS 60 is connected to the SN 70 by a signaling link 150. The SN 70 is also connected to the SSP 20 by an Integrated Service Digital Network (ISDN) 160.

The system 10 illustratively includes the SSP 30, the SCP 50 and the SN 70. The system 10 provides a voice and data call service to a customer to redirect, terminate or connect a call to the customer's telephone line in a telephone network based on whether the call is a voice call or a data call. Illustratively, the telephone customer is subscribed to telephone line 31 and is provided the service. Upon receiving a call to the telephone line 31, the SSP 30 issues a query to the SCP 50 for call handling instructions. The SCP 50 directs the SSP 30 to transfer the call to the SN 70. Upon receiving the call transferred from the SSP 30, the SN 70 determines whether the call is a voice call or a data call. If the SN 70 determines that the call is a voice call, the call is transferred back to the SSP 30.

Upon receiving the call from the SN 70, the SSP 30 again issues a query to the SCP 50 for call handling instructions. Included in the query is call data that indicates whether the call has been transferred from the SN 70. The SCP 50 receives the query, and determines from the call data that the SN 70 has transferred the call to the SSP 30. As the SN 70 has previously determined that the call is a voice call, the SCP 50 directs SSP 30 to connect the call to the telephone line 31.

If, on the other hand, the SN 70 determines that the call is a data call, then the SN 70 disconnects the call. Accordingly, the customer is not disturbed by data calls.

The SN 70 preferably monitors voice channel data of the call to determine whether the call is a voice call or a data call. If the SN 70 detects electronic communication data in the voice channel data of the call, then the SN 70 determines that the call is a data call. Conversely, if the SN 70 does not detect electronic communication device data in the voice channel data of the call, then the SN 70 determines that the call is a voice call.

In another embodiment, the SN 70 transfers the call to a service line if the SN 70 determines that the call is a data call. The service line is connected to an electronic communication device that is operable to receive the electronic communication device data.

In yet another embodiment, if the SN 70 determines that a call is a data call, the call is transferred back to the SSP 30. Upon receiving the call from the SN 70, the SSP 30 again issues a query to the SCP 50 for call handling instructions. Included in the query is call data that indicates whether the call has been transferred from the SN 70. As the SN 70 has previously determined that the call is a data call, the SCP 50 directs SSP 30 to connect the call to the telephone line 31.

If, on the other hand, the SN 70 determines that the call is not a data call, then the SN 70 disconnects the call. Accordingly, the system 10 allows only the connection of data calls.

Methods of transferring the call from the SSP 30 to the SN 70 and back to the SSP 30 from the SN 70 illustratively include call forwarding and call transferring. For example, in the call forwarding method, the SN 70 forwards the call to the called line at the SSP 30. In the call transferring method, the SN 70 places a call to the called line at the SSP 30, and then connects the call it received from the SSP 30 to the call it placed to the SSP 30, thus connecting the call from the calling line to the called line. Other methods of transferring or redirecting a call between the SSP 30 and the SN 70 may also be used.

1. Exemplary Operating Environment

Referring again to FIG. 1, a more detailed description of the exemplary AIN environment is now provided. Communications in the AIN 10 network occur over the trunk circuits 100, 102 and 104, the signaling links 110, 120, 130 140 and 150, and over the ISDN 160. These communications are covered by the Signaling System 7 (SS7) communications protocol and the AIN communications protocol. These protocols are described in more detail in the documents entitled "Bell Communications Research Specification of Signaling System 7," Document TR-NWT-000246, Issue 2 (Jun. 1991), plus Revision 1 (Dec. 1991), and Bellcore Specification GR-1298-CORE Switching Systems Generic Requirements for AIN, which are incorporated herein by reference.

The trunk circuits 100 are the voice path trunks, or voice channels, over which voice and data communications between a calling party and called party are established when calls are connected. The signaling links 110, 120, 130, 140 and 150 are bi-directional channels employing the SS7 protocol. Typically, the signaling links 110, 120, 130, 140 and 150 transmit SS7 messages at a 56 or 64 kilobit per second (kbps) rate. This is referred to as out-of-band signaling because the signaling does not take place over the voice channels in the trunk circuits 100, 102 and 104.

The SSP 20 serves a dedicated group of telephone lines. Telecommunication customers subscribe to one or more of these telephone lines. The telephone lines connect the SSP 20 to terminating devices, such as telephones or electronic communication devices. As illustrated, a telephone line 21 connects the SSP 20 to a telephone 22, and a telephone line 23 connects the SSP 20 to an electronic communication device 24. Likewise, the SSP 30 also serves a dedicated group of telephone lines, including telephone line 31, which connects the SSP 30 to a telephone 32, and telephone line 33, which connects the SSP 30 to an electronic communication device 34. The electronic communication devices 24 and 30 include facsimile machines, computer modems, and other electronic communication devices designed to transmit electronic communication device data over a voice channel.

Each of the telephone lines 21, 23, 31 and 33 is assigned a directory number. A directory number is a number that is dialed or input by an originating terminating device at a telephone line to reach a terminating device on another telephone line associated with the directory number. Thus, a directory number is typically input into a telephone or electronic communication device to establish a voice channel to another telephone or electronic communication device attached to the network.

The SSPs 20 and 30 are connected to the STP 40 via the signaling links 110 and 120, respectively. The STP 40 is a multi-port high speed packet switch that routes each incoming message to an outgoing signaling link based on routing information contained in the SS7 message.

The STP 40 is connected to the SCP 50 via the signaling link 130. The SCP 50 contains programmable service-independent capabilities (or service logic) that are under control of the telephone service providers, and also contains subscriber databases that are used to provide advanced call-processing capabilities to a subscriber. Subscriber information for the voice and data call service is stored in the subscriber databases.

The SMS 60 is connected to the SCP 50 via the signaling link 140. The SMS 60 interfaces with the offices of the telephone service providers and provides a platform for remotely provisioning the SCP 50 to provide advanced call-processing capability to a subscriber. Thus, when a customer subscribes to certain AIN services, such as the voice and data call service, or modifies an ensemble of AIN services, the telephone service provider provides this information to the SCP 50 via the SMS 60.

The SN 70 includes voice and dual tone multi-frequency (DTMF) signal recognition devices and voice synthesis devices. The SN 70 is connected to the SMS 60 via the signaling link 150, and is also connected to the SSP 20 via the ISDN link 160. The SN 70 is typically employed in an AIN service to provide voice channel connection to a call or transfer data to a subscriber over a switched connection during or after a call.

Set-up, management and release of trunk circuits that carry voice channel data between an originating station and terminating station is governed by the ISDN User Part (ISUP) protocol known to those of ordinary skill in the art of telephone switching. A caller may place a call to a directory number served by the same SSP from which the call is placed, or may place a call to a directory number served by a different SSP from which the call is placed. Upon logical completion of the call, the system 10 rings the called line by providing a ringing signal to the called telephone line associated with the called directory number.

Call set-up differs between calls that originate and terminate at the same SSP and calls that originate and terminate at different SSPs. Calls that originate and terminate at the same SSP do not use ISUP signaling. For example, if a caller places a call from the telephone 22 to a directory number associated with the telephone line 23, ISUP signaling is not required. Thus, if the electronic communication device 24 is not in use, the SSP 20 will connect the call to the telephone line 23.

However, if a caller places a call from the telephone 22 to a directory number associated with the telephone line 31, the call is placed to the SSP 30, which is an out-of-switch number. The SSP 20 transmits an ISUP Initial Address Message (IAM) to reserve an idle n circuit between the SSPs 20, 30. The IAM includes data related to the call ed party and calling party, and is routed via the STP 40. Upon receipt of the IAM, the SSP 30 examines the dialed directory number, determines that it serves the telephone line 31, and that the telephone line 31 is available for ringing. The SSP 30 then applies a ring pattern signal to the telephone line 31, and then transmits an Address Complete Message (ACM) to the SSP 20 via the STP 40. Upon receiving the ACM, the SSP 20 provides a ring signal beard by the calling party and connects the telephone line to the reserved trunk to complete the voice circuit from the calling party to the called party. If a voice channel is available over the trunk circuits 100, communication between the telephones 22 and 32 occurs over a voice channel located in the trunk circuits 100. If all of the trunk circuits 100 are allocated, however, a voice channel is established between the SSPs 20 and 30 through at least one other SSP (not shown) and the trunk circuits 102 and 104.

2. Exemplary Modes of Operation

Figure 2:
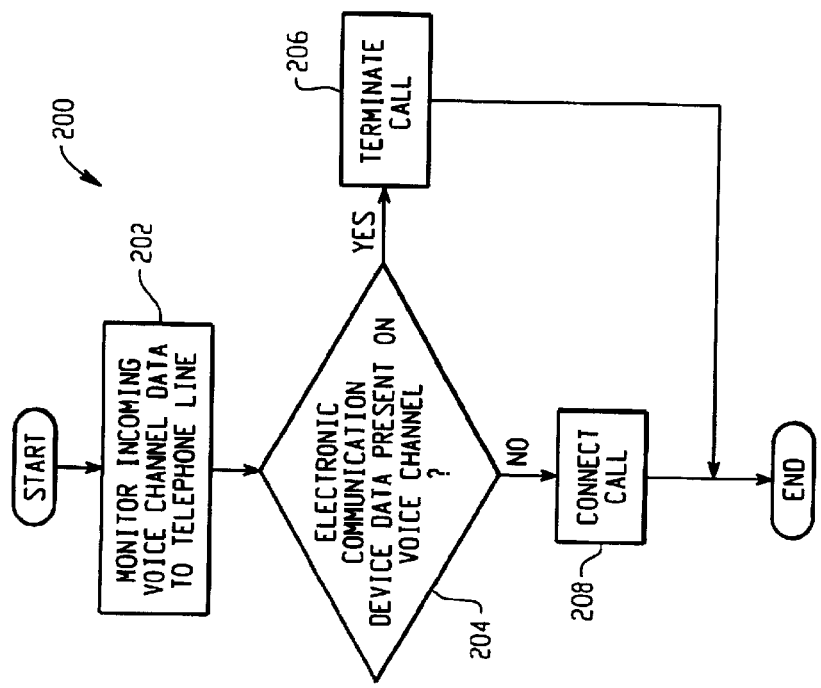
FIG. 2 is a flow diagram describing an illustrative process for conditionally connecting telephone calls.

An illustrative process of handling phone calls is now described with reference to FIGS. 2–4. In particular, FIG. 2 provides a flow diagram 200 describing a process for conditionally connecting incoming calls to a telephone line in accordance with a voice and data call service. The voice channel data of an incoming call to the telephone line is monitored, as shown in step 202. From the data monitored in step 202, the system 10 determines if electronic communication device data is present on the voice channel of the incoming call, as shown in step 204. If the system 10 determines that electronic communication device data is present, the call is terminated, as shown in step 206. On the other hand, if the system 10 determines that electronic communication device data is not present, the system 10 connects the call, i.e., the system 10 rings the called line by providing a ringing signal to the called telephone line, as shown in step 208. Providing a ringing signal to the called telephone line activates a terminating device, e.g. a telephone, connected to the called line and causes it to ring. Accordingly, calls containing electronic communication device data on the voice channel cannot be connected to the telephone line.

Figure 3:
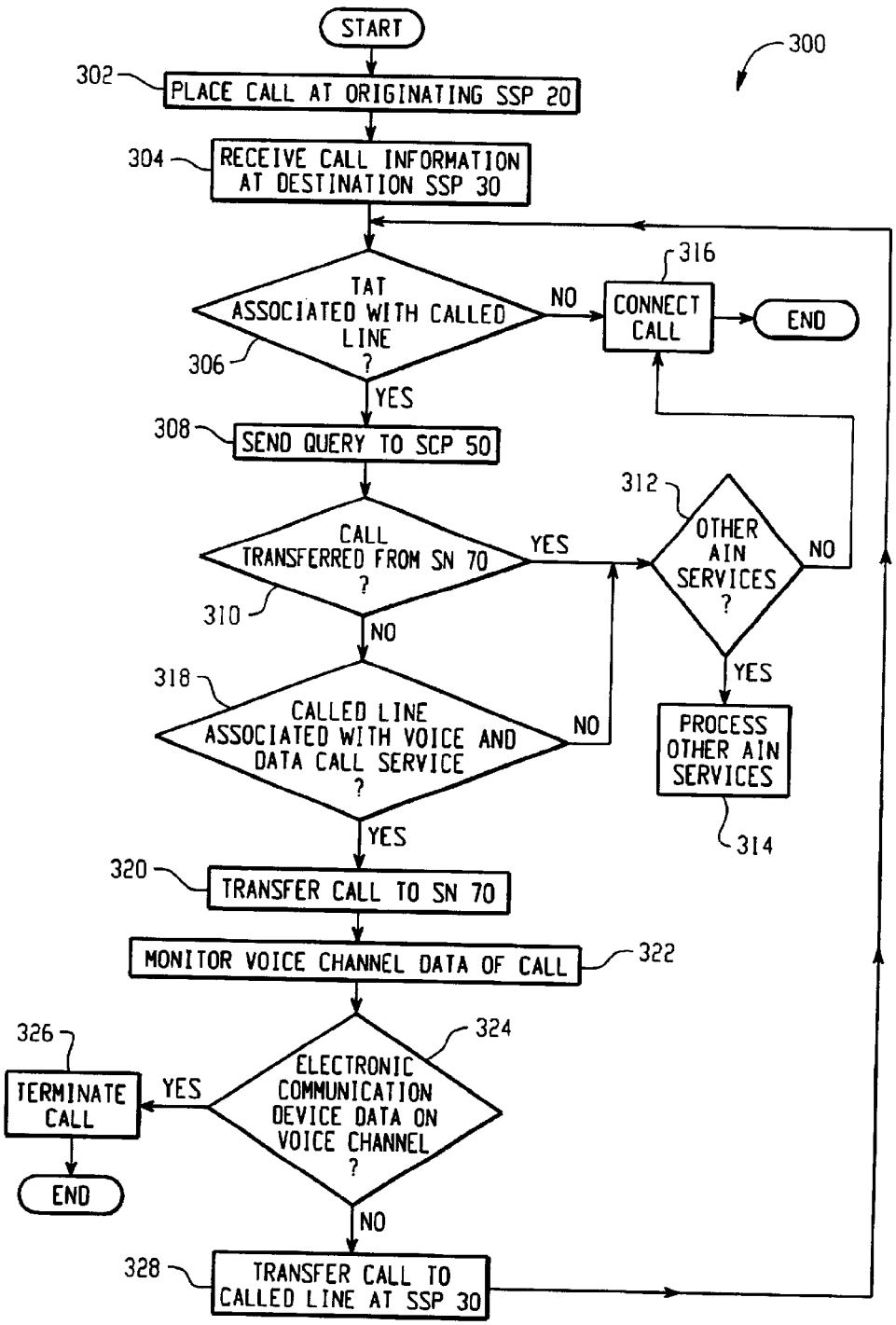
FIG. 3 is a more detailed flow diagram describing an illustrative process for conditionally connecting telephone calls in the AIN environment.

FIG. 3 is a more detailed flow diagram describing the illustrative process of FIG. 2 as implemented in an AIN environment. When a customer subscribes to the voice and data call service, a Terminating Attempt Trigger (TAT) is associated with the customer's telephone line. Illustratively, the customer subscribed to the telephone line 31 has also subscribed to the service. Thus, any calls to the telephone line 31 will encounter the TAT and the SSP 30, which serves the telephone line 31, will issue a query to the SCP 50. As previously described, information related to the voice and data call service is stored in subscriber databases in the SCP 50. Thus, the service is activated in response to the query.

In step 302, a call is placed from a terminating device connected to the SSP 20 to the telephone line 31 of the SSP 30. The SSP 20 receives the directory number associated with the telephone line 31 and sets up the communication to the SSP 30. The SSP 20 then sends the information relating to the communication in a signaling message to the SSP 30, and the SSP 30 receives this information as shown in step 304.

After receiving the call information, the SSP 30 checks in step 306 if there is a TAT trigger associated with telephone line 31, which is the called line. Encountering the TAT generates a query that is sent to the SCP 50. The query is a packet message sent over one or more signaling links to the SCP 50. The packet message includes call data related to the call. The call data includes a first field storing the calling line number, a second field storing the called line number, and a third field indicating whether the SN 70 has transferred the call. The calling line number in the first field is associated with the line from which a call is placed, and the called line number in the second field is associated with a line to which a call is placed.

If a TAT is not associated with the called line, the SSP 30 continues call processing and connects the call to the called line, as shown in step 316. However, if a TAT is associated with the called line, the SSP 30 suspends the call processing and generates a packet that is sent to the SCP 50, as shown in step 308. Because the called line is the telephone line 31, the TAT is encountered and the query is sent to the SCP 50.

The SCP 50 then determines if the call has been transferred from the SN 70, as shown in step 310. The SCP 50 makes this determination from data stored in the third field of the packet message. Illustratively, the third field will store a directory number associated with the SN 70 when the SN 70 transfers the call back to the called line at the SSP 30. The directory number associated with the SN 70 is stored in the third field when the SN 70 transfers the call back to the called line at the SSP 30. Thus, if the third field has a directory number associated with the SN 70, then the call has been transferred from the SN 70; if the third field does not have a directory number associated with the SN 70, then the call has not been transferred from the SN 70.

If the SCP 50 determines that the call has been transferred from the SN 70, then the SCP 50 determines if other AIN services are associated with the called line, as shown in step 312. If other AIN services are associated with the called line, the SCP 50 will issue the appropriate instructions for these calling features or enhanced services, as shown in step 314. If no other AIN services are associated with the called line, the SCP 50 provides to the SSP 30 instructions to connect the call, as shown in step 316.

However, if the SCP 50 determines that the call has not been transferred from the SN 70, then the SCP 50 queries its database to determine whether the called line is associated with the voice and data call service, as shown in step 318. If the called line is not associated with the voice and data call service, then the SCP 50 determines if other AIN services are associated with the called line, as previously described with reference to step 312.

However, if the called line is associated with the voice and data call service, the SCP 50 directs the SSP 30 to transfer the call to the SN 70, as shown in step 320. Upon receiving the call, the SN 70 establishes a voice channel for the call and monitors the voice channel data for the presence of electronic communication device data, as shown in step 322. The SN 70 is programmed to recognize data from an electronic communication device in accordance with transmission standards known to those of ordinary skill in the art; e.g., the SN 70 will recognize the presence of a facsimile machine based on CCITT Groups 1–4 facsimile standards. In step 324 the SN 70 determines if electronic communication device data is present on the voice channel. If electronic communication device data is present on the voice channel, then the call is terminated, as shown in step 326. If, however, the SN 70 determines that electronic communication device data is not present, then the call is transferred back to the called line at the SSP. 30, as shown in step 328.

After receiving the transferred call from the SN 70, the SSP 30 will again determine if there is a TAT trigger associated with the called line. The TAT will again generate a packet that is sent to the SCP 50. Thereafter, all steps are repeated through step 310, as previously described. However, in the second execution of step 310, the SCP 50 will receive a number associated with the SN 70 from the third field of the packet message and determine that the SN 70 has transferred the call. Thus, the SCP 50 determines if other AIN services are associated with the telephone line, as shown in step 312. Accordingly, the SCP 50 avoids endlessly transferring the call to the SN 70 by detecting an originating number associated with the SN 70.

Figure 4:
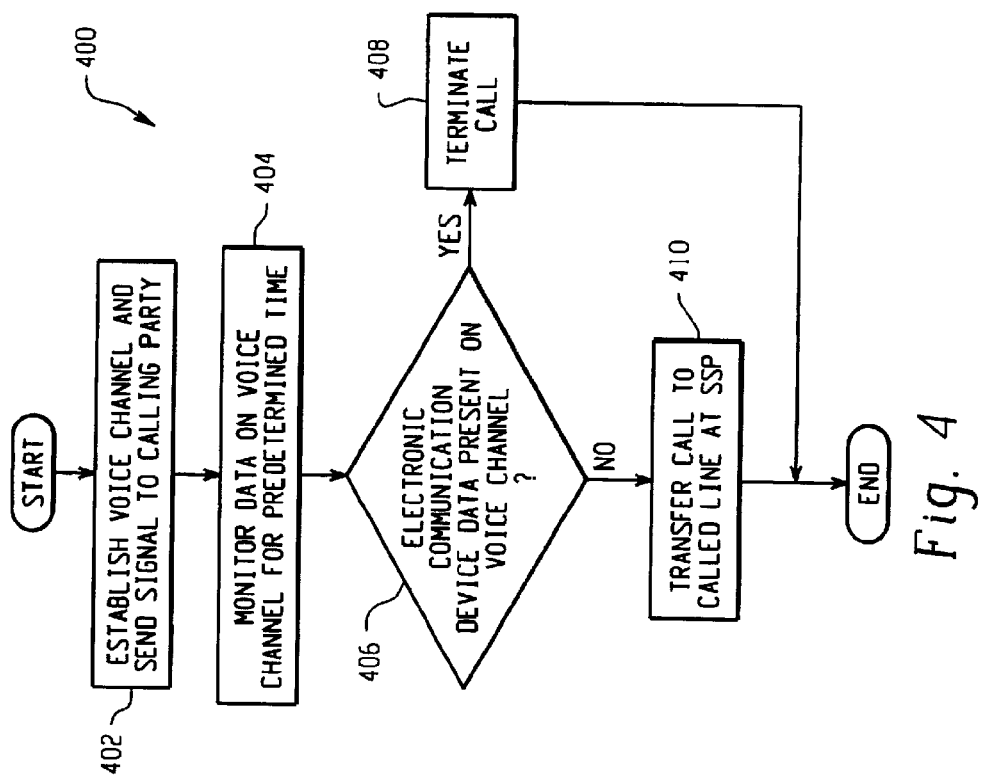
FIG. 4 is a flow diagram describing an illustrative process performed by a Service Node (SN) to determine whether a call is a voice call or a data call.

Referring now to FIG. 4, flow diagram 400 describes an illustrative process of monitoring the voice channel at the SN 70 to determine whether the voice channel data of the call includes electronic communication device data. In step 402, the SN 70 establishes a voice channel and sends a signal to the calling party. Because the SN 70 will monitor the voice channel for a brief period of time to determine the presence of electronic communication device data, the calling party may notice a slight delay during the monitoring period. Thus, the SN 70 issues a message over the voice channel in response to the monitoring period. Illustratively, the messages are "One moment, please," or "Please wait."

In step 404, the SN 70 monitors the voice channel data for a predetermined time to determine the presence of electronic communication device data. A monitoring time period is selected so that if an electronic communication device has initiated the call, the electronic communication device will respond as if the call has been connected and transmit electronic communication device data over the established voice channel. Illustratively, this time period is approximately four (4) seconds.

As previously described, the SN 70 is programmed to recognize data from an electronic communication device in accordance with known transmission standards. If the SN 70 determines that electronic communication device data is present on the voice channel in step 406, then the call is a data call and is thus terminated, as shown in step 408. If, however, the SN 70 determines that electronic communication device data is not present on the voice channel, then the call is a voice call and is thus transferred back to the SSP 30, as shown in step 410.

The voice message of step 402 may alternatively be provided during the execution of step 410. Illustratively, the message in response to the monitoring period is "Connecting."

Figure 5:
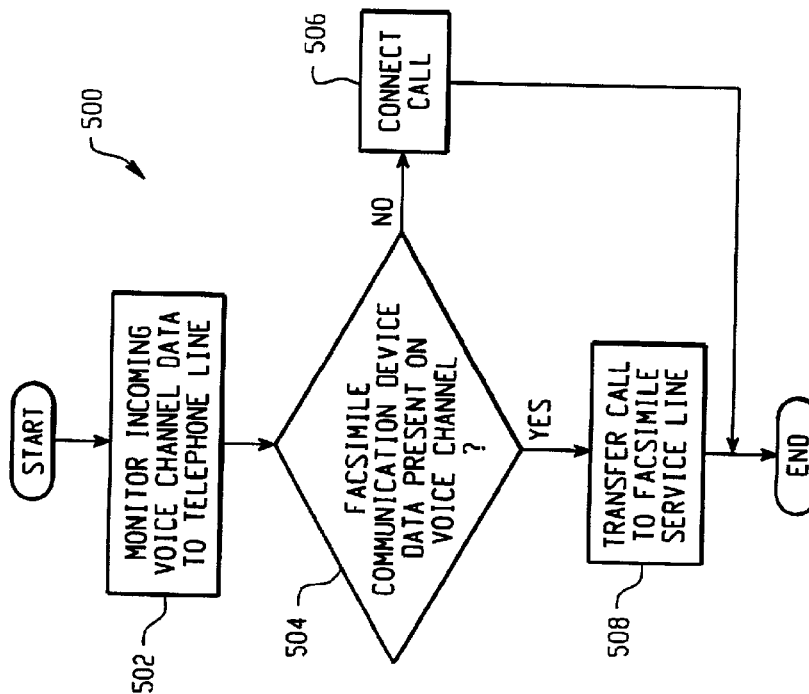
FIG. 5 is a flow diagram describing an illustrative process for conditionally connecting a data call to a service line.

FIG. 5 provides a flow diagram 500 describing an illustrative process for conditionally connecting a data call to a service line. The process in particular provides a facsimile service for a telephone line. In step 502, incoming voice channel data to the telephone line is monitored for the presence of facsimile communication device data. From data monitored in step 502, the system 10 determines if facsimile communication device data is present on the voice channel of the incoming call, as shown in step 504. If the system 10 determines that facsimile communication device data is not present, the system 10 connects the call to the called line, as shown in step 506. However, if the system 10 determines that facsimile communication device data is present on the voice channel, then the call is transferred to a facsimile service line, as shown in step 508. The facsimile service line is connected to an electronic communication device operable to receive the facsimile transmission.

Illustratively, the facsimile service line can be another telephone line associated with the subscriber. Referring to FIG. 1, if the subscriber subscribes to the telephone lines 31 and 33, the telephone line 33 can be specified as the facsimile service line. Accordingly, calls that transmit facsimile communication device data and that are directed to the telephone line 31 are connected to the telephone line 33.

Alternatively, the facsimile service line can be a line associated with the service provider. The service provider then receives the facsimiles sent to the telephone line 31. The facsimile received by the service provided may then be forwarded to the subscriber either as a bard copy or as an electronic file. The subscriber may further be notified of the facsimile by a telephone call, e-mail or voice mail message.

Accordingly, calls containing facsimile communication device data on a voice channel are prevented from connecting to the subscriber's telephone; however, the subscriber will still receive facsimiles that are sent to his or her telephone line. Furthermore, the subscriber need only provide a single directory number to receive both voice and data calls.

Figure 6:
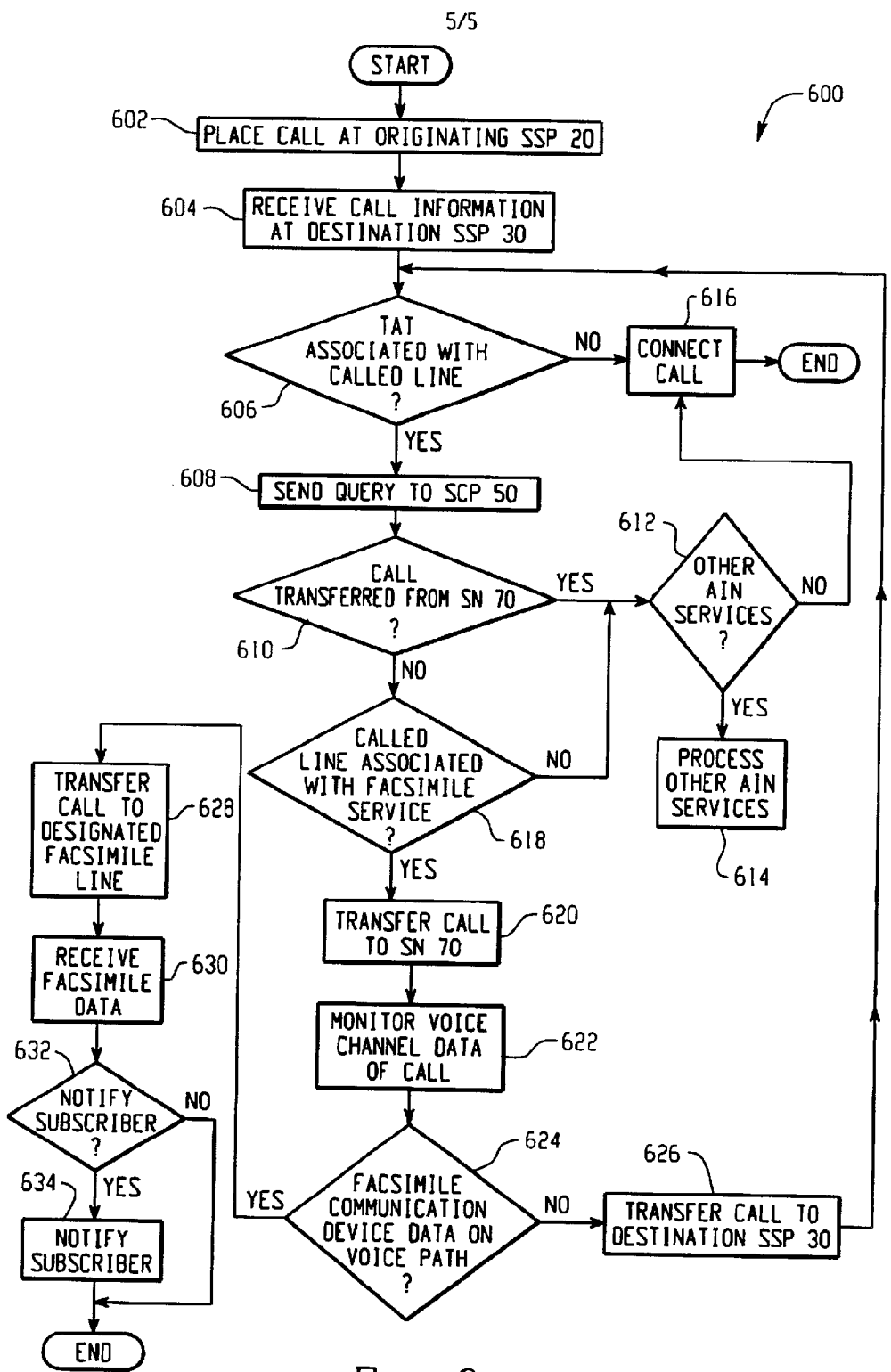
FIG. 6 is a more detailed flow diagram of the process of FIG. 5 as implemented in the AIN environment.

FIG. 6 shows a flow diagram 600 describing the illustrative process of FIG. 5 as implemented in an AIN environment. Illustratively, a customer subscribed to telephone line 31 is provided the facsimile service, and the telephone line 33 is specified as the service line.

In step 602, a call is placed from a terminating device connected to the SSP 20 to line 31 of the SSP 30. The SSP 20 receives the directory number associated with the telephone line 31 and sets up the communication to the SSP 30. The SSP 20 then sends the information relating to the communication in a signaling message to the SSP 30, and the SSP 30 receives this information as shown in step 604.

After receiving the call information, the SSP 30 checks in step 606 if there is a TAT trigger associated with telephone line 31, which is the called line. If a TAT is not associated with the called line, the SSP 30 continues call processing and connects the call to the called line, as shown in step 616. However, if a TAT is associated with the called line, the SSP 30 suspends the call processing and generates a packet that is sent to the SCP 50, as shown in step 608. Because the called line is the telephone line 31, the TAT is encountered and the query is sent to the SCP 50.

The SCP 50 then determines if the call has been transferred from the SN 70, as shown in step 610. The SCP 50 makes this determination from data stored in the third field of the packet message. Illustratively, the third field will store a directory number associated with the SN 70 when the SN 70 transfers the call back to the called line at the SSP 30. The directory number associated with the SN 70 is stored in the third field when the SN 70 transfers the call back to the called line at the SSP 30. Thus, if the third field has a directory number associated with the SN 70, then the call has been transferred from the SN 70; if the third field does not have a directory number associated with the SN 70, then the call has not been transferred from the SN 70.

If the SCP 50 determines that the call has been transferred from the SN 70, then the SCP 50 determines if other AIN services are associated with the called line, as shown in step 612. If other AIN services are associated with the called line, the SCP 50 will issue the appropriate instructions for these calling feature or enhanced services, as shown in step 614. If no other AIN services are associated with the called line, the SCP 50 provides to the SSP 30 instructions to connect the call, as shown in step 616.

However, if the SCP 50 determines that the call has not been transferred from the SN 70, then the SCP 50 queries its database to determine whether the called line is associated with the facsimile service, as shown in step 618. If the called line is not associated with the facsimile service, then the SCP 50 determines if other AIN services are associated with the called line, as previously described with reference to step 612.

However, if the called line is associated with the facsimile service, the SCP 50 directs the SSP 30 to transfer the call to the SN 70, as shown in step 620. Upon receiving the call, the SN 70 establishes a voice channel for the call and monitors the voice channel data for the presence of facsimile device data, as shown in step 622. A monitoring time period is selected so that if a facsimile communication device has initiated the call, the facsimile communication device will respond as if the call has been answered and transmit facsimile communication device data over the established voice path. Illustratively, this time period is approximately four (4) seconds. Upon detecting facsimile communication device data on the voice channel, the SN 70 will immediately transfer the call to the designated facsimile line to prevent the facsimile communication device from timing out and terminating the call.

In step 624, the SN 70 determines if facsimile device data is present on the voice channel. If the facsimile data is not present on the voice channel, then the call is transferred back to the called line at the SSP 30, as shown in step 626. After receiving the transferred call from the SN 70, the SSP 30 will again generate a packet that is sent to the SCP 50. Thereafter, all steps are repeated through step 610, as previously described. However, in the second execution of step 610, the SCP 50 will receive a number associated with the SN 70 from the third field of the packet message and determine that the SN 70 has transferred the call. Thus, the SCP 50 determines if other AIN services are associated with the telephone line, as shown in step 612. Accordingly, the SCP 50 avoids endlessly transferring the call to the SN 70 by detecting an originating number associated with the SN 70.

However, if the SN 70 determines that facsimile device data is present on the voice channel, then the call is transferred to the telephone line 33, which is the service line, as shown in step 628. In step 630, the call is connected to the telephone line 33 and the facsimile data is received. In step 632, the system 10 determines if the subscriber is to be notified. If so, the subscriber is notified in step 634. The notification can be a telephone call, a voice mail, or an e-mail message.

Figure 7:
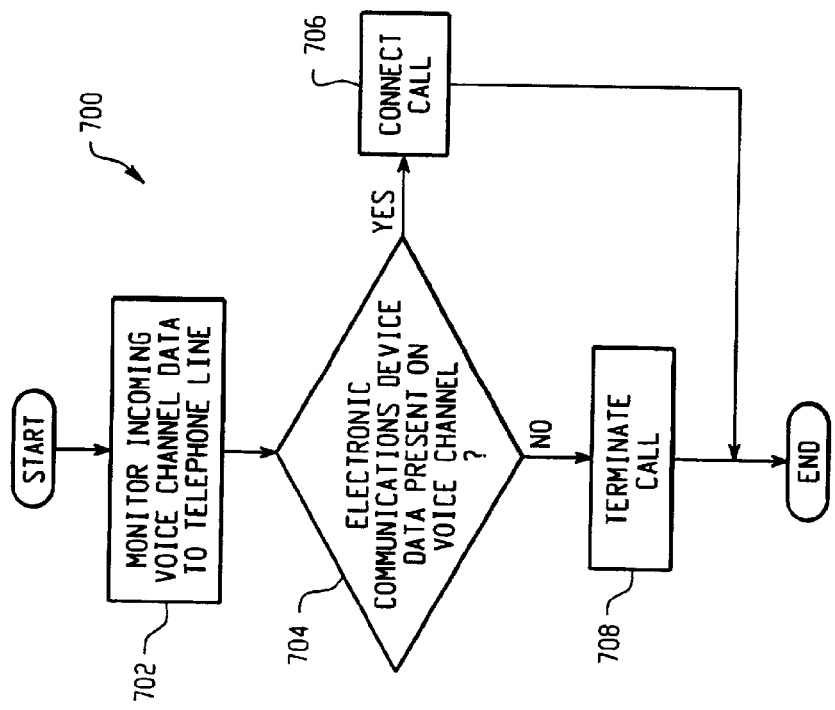
FIG. 7 is a flow diagram describing yet another illustrative process for conditionally connecting telephone calls.

FIG. 7 provides a flow diagram 700 describing yet another illustrative process of conditionally connecting telephone calls. The process of FIG. 7 allows only data calls to be connected to a called line. In step 702, the system 10 monitors incoming voice channel data to the telephone line. From the data monitored in step 702, the system 10 determines if electronic communication device data is present on the voice channel of the incoming call, as shown in step 704. If the system 10 determines that electronic communication device data is present on the voice channel, the system 10 connects the call to the called line, as shown in step 706. On the other hand, if the system 10 determines that electronic communication device data is not present on the voice channel, the call is terminated, as shown in step 708.

Additionally, the system 10 can be programmed to inform the calling party that he or she has dialed a line that is dedicated to an electronic communication device. Illustratively, the notification may be a recorded message stating "You have called a facsimile-only line. Please check the number you intend to call and try again," or "You have called a computer-only line. Please check the number you intended to call and try again."

The illustrative process of FIG. 7 is implemented in an AIN environment in the same manner as described with reference to FIGS. 2 and 3. However, if the SN 70 detects the presence of electronic communication device data as described with reference to step 322, then immediately upon such detection the SN 70 transfers the call back to the called line at SSP 30 to prevent the electronic communication device from timing out and terminating the call. Likewise, if the SN 70 does not detect the presence of electronic communication device data as described with reference to step 322, then the call is terminated.

The system and method and the exemplary modes of operation have been illustrated with a telecommunications customer subscribing to the service. The service may be provided free of charge by the telephone service provider, or may be provided in exchange for a subscription fee. Of course, the service may also be provided to telephone lines not associated with customers, i.e., the service may be provided to any telephone line served by the service provider.

The embodiments described herein are examples of structures, systems or methods having elements corresponding to the elements of the invention recited in the claims. This written description may enable those of ordinary skill in the art to make and use embodiments having alternative elements that likewise correspond to the elements of the invention received in the claims. The intended scope of the invention thus includes other structures, systems or methods that do not differ from the literal language of the claims, and further includes other structures, systems or methods with insubstantial differences from the literal language of the claims.

What is claimed is:

1. A telephone network comprising:
   a service switching point serving a telephone line, the service switching point being operable to receive a call to the telephone line and issue a query in response to receiving the call;
   a service control point in communication with the service switching point over a first communication path, the service control point being operable to provide instructions to the service switching point to connect the call to the telephone line or transfer the call; and
   a service node in communication with the service switching point over a second communication path, the service node being operable to receive a transferred call from the service switching point and determine whether the transferred call is a voice call or a data call, and transfer the transferred call to the service switching point if the transferred call is not a data call;
   wherein upon receiving the call to the telephone line, the service switching point issues a first query to the service control point, the service control point instructs the service switching point to transfer the call to the service node, the service switching point transfers the call to the service node, and the service node receives the call and determines whether the call is a voice call or a data call, and transfers the call back to the service switching point if the call is not a data call.

2. The telephone network of claim 1, wherein the service switching point receives the call transferred from the service node and issues a second query to the service control point, and the service control point instructs the service switching point to connect the call to the telephone line.

3. The telephone network of claim 2, wherein the service node monitors voice channel data of the call to determine whether the call is a voice call or a data call.

4. The telephone network of claim 3, wherein the service node determines the call is a data call if the service node detects the presence of electronic communication device data in the voice channel data.

5. The telephone network of claim 4, wherein the electronic communication device data is generated by a first facsimile device.

6. The telephone network of claim 5, wherein the service node transfers the call to a service line if the call is a data call.

7. The telephone network of claim 6, wherein the service line is connected to a second facsimile device operable to receive the electronic communication data.

8. The telephone network of claim 2, wherein the service switching point includes a terminating attempt trigger associated with the telephone line, the terminating attempt trigger being activated upon the service switching point receiving the call to the telephone line, and wherein the service switching point issues the first and second queries in response to the terminating attempt trigger being activated.

9. The telephone network of claim 8, wherein the first and second queries include call data indicating whether the call has been transferred by the service node.

10. The telephone network of claim 9, wherein the service control point instructs the service switching point to transfer the call to the service node if the call data indicates the call has not been transferred by the service node.

11. The telephone network of claim 10, wherein the service control point instructs the service switching point to connect the call to the telephone line if the call data indicates the call has been transferred by the service node.

12. The telephone network of claim 1, wherein the service node terminates the call if the call is a data call.

13. The telephone network of claim 1, wherein the service node transfers the call to a service line if the call is a data call.

14. The telephone network of claim 13, wherein the service line is connected to a terminating device operable to receive the data call.

15. A method of processing a call to a telephone line in a telephone network, the telephone network comprising a service switching point, the service switching point serving the telephone line, a service control point, and a service node, the service control point and the service node in communication with the service switching point over first and second communication paths, respectively, the method comprising the steps of:
   receiving the call to the telephone line at the service switching point;
   issuing a first query from the service switching point to the service control point in response to receiving the call;
   in response to the first query, issuing instructions from the service control point to instruct the service switching point to transfer the call to the service node;
   determining at the service node whether the call is a voice call or a data call; and
   transferring the call from the service node back to the service switching point if the call is not a data call.

16. The method of claim 15, further comprising the steps of:
   issuing a second query from the service switching point to the service control point in response to receiving the call transferred from the service node; and
   in response to the second query, issuing instructions from the service control point to instruct the service switching point to connect the call to the telephone line.

17. The method of claim 16, further comprising the step of transferring the call from the service node to a service line if the call is a data call.

18. The method of claim 17, further comprising the step of receiving the data call at a terminating device connected to the service line.

19. The method of claim 18, wherein the terminating device is a facsimile device.

20. The method of claim 16, further comprising the step of terminating the call if the service node determines the call is a data call.

21. The method of claim 15, wherein the step of determining at the service node whether the call is a voice call or a data call comprises the steps of:

connecting the call to the service node;
monitoring voice channel data of the call at the service node; and
determining the call is a data call if the service node detects the presence of electronic communication device data in the voice channel data.

22. The method of claim 21, further comprising the step of transmitting a voice message indicating a delay from the service node in response to monitoring voice channel data of the call at the service node.

23. A method of processing a call to a telephone line in a telephone network, the telephone network comprising a service switching point, the service switching point serving the telephone line, a service control point, and a service node, the service control point and the service node in communication with the service switching point over first and second communication paths, respectively, the method comprising the steps of:
receiving the call to the telephone line at the service switching point;
issuing a query from the service switching point to the service control point in response to receiving the call;
issuing from the service control point to the service switching point an instruction to transfer the call to the service node;
determining at the service node whether the call is a data call;
transferring the call from the service node back to the service switching point based on the determination at the service node; and
connecting the call transferred from the service node to the telephone line at the service switching point.

24. The method of claim 23, wherein the step of determining at the service node whether the call is a data call comprises the steps of:
connecting the call to the service node;
monitoring voice channel data of the call at the service node;
determining the call is a data call if the service node detects the presence of electronic communication device data in the voice channel data; and
determining the call is not a data call if the service node does not detect the presence of electronic communication device data in the voice channel data.

25. The method of claim 24, wherein the step of transferring the call from the service node back to the service switching point based on the determination at the service node comprises the step of transferring the call to the service switching point if the service node determines the call is not a data call.

26. The method of claim 25, further comprising the step of transferring the call to a service line if the service node determines the call is a data call.

27. The method of claim 24, wherein the step of transferring the call from the service node back to the service switching point based on the determination at the service node comprises the step of transferring the call to the service switching point if the service node determines the call is a data call.

28. The method of claim 23, wherein the step of issuing from the service control point to the service switching point an instruction to transfer the call to the service node comprises the steps of:

determining whether the service node has transferred the call to the service switching point; and
issuing instructions to the service switching point to transfer the call to the service node if the service node has not transferred the call to the service switching point.

29. The method of claim 28, wherein the step of determining at the service node whether the call is a data call comprises the steps of:
connecting the call to the service node;
monitoring voice channel data of the call at the service node;
determining the call is a data call if the service node detects the presence of electronic communication device data in the voice channel data; and
determining the call is not a data call if the service node does not detect the presence of electronic communication device data in the voice channel data.

30. The method of claim 29, wherein the step of transferring the call from the service node back to the service switching point based on the determination at the service node comprises the step of transferring the call to the service switching point if the service node determines the call is not a data call.

31. The method of claim 29, wherein the step of transferring the call from the service node back to the service switching point based on the determination at the service node comprises the step of transferring the call to the service switching point if the service node determines the call is a data call.

32. A telephone network, comprising:
a service switching point serving a telephone line, the service switching point being operable to issue a query upon receiving a call to the telephone line;
a service control point in communication with the service switching point, the service control point being operable to receive the query and instruct the service switching point to transfer the call; and
a service node in communication with the service switching point, the service node being operable to receive the call transferred from the service switching point and monitor voice channel data of the call to determine whether electronic communication device data is present in the voice channel data of the call, and further being operable to transfer the call back to the service switching point for connection to the telephone line based on the determination.

33. The telephone network of claim 32, wherein the service control point is further operable to instruct the service switching point to connect the call to the telephone line after the service switching point receives the call transferred from the service node.

34. The telephone network of claim 33, wherein the service node transfers the call back to the service switching point if the service node determines that electronic communication data is not present in the voice channel data of the call.

35. The telephone network of claim 34, wherein the service node transfers the call to a service line if the service node determines that electronic communication device data is present in the voice channel data of the call.

36. The telephone network of claim 35, wherein the service line is connected to an electronic communication device being operable to receive the electronic communication device data.

37. The telephone network of claim 33, wherein the service node transfers the call back to the service switching point if the service node determines that electronic communication data is present in the voice channel data of the call.

38. The telephone network of claim 37, wherein the service node terminates the call if the service node determines that electronic communication data is not present in the voice channel data of the call.

39. The telephone network of claim 38, wherein the service node provides a voice communication prior to terminating the call if the service node determines that electronic communication data is not present in the voice channel data of the call.

* * * * *